United States Patent [19]

Eto

[11] Patent Number: 5,565,103

[45] Date of Patent: Oct. 15, 1996

[54] SOLID MATERIAL FLOW-SEPARATING METHOD

[75] Inventor: Shunji Eto, Tokyo, Japan

[73] Assignee: Aquatech, Ltd., Tokyo, Japan

[21] Appl. No.: 521,945

[22] Filed: Aug. 31, 1995

Related U.S. Application Data

[63] Continuation of Ser. No. 193,999, Feb. 9, 1994, abandoned.

[30] Foreign Application Priority Data

Jun. 4, 1993 [JP] Japan ...................................... 5-160435

[51] Int. Cl.⁶ .......................................................... C02F 3/28
[52] U.S. Cl. ........................... 210/601; 210/615; 210/747; 210/801; 210/803; 210/170; 210/521
[58] Field of Search ...................................... 210/601, 747, 210/801, 803, 154, 162, 299, 312, 519, 521, 522, 776, 615, 170

[56] References Cited

U.S. PATENT DOCUMENTS

| 815,722 | 3/1906 | Lydon | 210/154 |
|---|---|---|---|
| 1,110,408 | 9/1914 | Stritzel | 210/154 |
| 2,603,354 | 7/1952 | Way et al. | 210/747 |
| 2,673,451 | 3/1954 | Gariel | 210/154 |
| 3,365,060 | 1/1968 | Hsu | 210/803 |
| 3,799,349 | 3/1974 | Stewart | 210/154 |
| 5,298,172 | 3/1994 | Smith | 210/747 |

FOREIGN PATENT DOCUMENTS

| 1578228 | 7/1969 | France . | |
| 3149545 | 1/1983 | Germany . | |
| 63-310696 | 12/1988 | Japan . | |
| 3-221110 | 1/1990 | Japan . | |
| 3-118810 | 5/1991 | Japan | 210/803 |
| WO89/12492 | 12/1989 | WIPO . | |

*Primary Examiner*—Peter A. Hruskoci
*Attorney, Agent, or Firm*—Armstrong, Westerman, Hattori, McLeland & Naughton

[57] ABSTRACT

In a solid material flow-separating method for separating fine solid material from fluid, plural massive, net-shaped or pipe-shaped flow-separating members each having opening portions of about 1 to 5 cm in equivalent diameter are disposed along a fluid flowing direction in a treatment tank, and the fine solid material floating in the fluid is trapped and collected through the opening portions, and help up in a predetermined area, thereby separating the fine solid material from the fluid.

10 Claims, 4 Drawing Sheets

SOLID MATERIAL FLOW-SEPARATING METHOD

This application is a Continuation of application Ser. No. 08/193,999 filed Feb. 9, 1994, now abandoned.

BACKGROUND OF THE INVENTION

1. Field of the Invention

This is invention relates to a solid material flow-separating method, particularly to a solid material flow-separating method for conducting a separation treatment on fine solid material in fluid such as liquid, and more particularly to a solid material flow-separating method for separating fine solid pollutant floating in polluted water

2. Description of Related Art

Various kinds or methods have been conventionally proposed and used to purify polluted water such as various kinds of waste water, river water polluted by the waste water, etc. The conventional purifying methods for the polluted water are mainly classified into the following two methods. One method is (1) a chemical treatment method in which pollutant in polluted water is subjected to a chemical treatment to make the pollutant harmless, and the pollutant is agglomerated and precipitated to separate the pollutant From the water, and the other method is (2) a biological treatment method in which the pollutant is biologically made harmless, for example, by a biomembrane or active sludge, and then the pollutant is flocculated to separate the pollutant from the water.

In most of recent biological treatments, microorganism is fixed to a prescribed carrier to form a biomembrane. In order to from the biomembrane there have been proposed a method of alternately disposing aerobic state and anaerobic state on the carrier, and a method of simultaneously disposing aerobic state and anaerobic, state on a carrier to form a hollow carrier as disclosed Japanese Laid-open Patent Application No. 63-310696.

Further, for the purpose of purification of polluted river water, an inter-conglomerate contact oxidation method of purifying river water using river beds has been recently proposed and already practically used as a biological treatment method. In the inter-conglomerate contact oxidation method, a conglomerate layer is formed by effectively using conglomerate such as gravel in river or the like, and river water is made to flow through the conglomerate layer for a biological treatment. By this method, BOD (Biochemical Oxygen Demand) and SS (Suspended Solid) can be greatly reduced, and thus spotlight of attention is focused on this method as a purification method for polluted water such as polluted river water.

Any one of the conventional polluted water purifying methods as described above requires two steps of treatments of a reaction treatment system and a precipitation/separation treatment system in both of the chemical treatment and the biological treatment.

The inventor has made various studies on purification for polluted water in a water system such as river. Particularly for the purpose of improvement in practicability by effectively using the inter-conglomerate contact oxidation method, the applicant has considered an improved technique to the inter-conglomerate contact oxidation method and developed a separation material constituting a purifying treatment system which is completely different from the conventional treatment for polluted water. This separation material and a polluted-water treatment using the separation material are proposed in Japanese Laid-open Patent Application No. Hei-3(1991)-221110.

SUMMARY OF THE INVENTION

An object of this invention is to easily separate and collect floated fine solid material in fluid by a simple method.

Another object of this invention is to provide a method of separating and removing SS (suspended solid) in polluted water such as polluted river water more effectively and efficiently to thereby purify the polluted water.

In order to attain the above objects, the inventor has earnestly considered the action of polluted-water purification, etc. on the basis of the knowledge on a phenomenon, etc. which is obtained through the development of the separation material as described above. Through this consideration, the inventor has thrown light upon the behavior of floated fine solid material in fluid, and implemented this invention.

The solid material flow-separating method of this invention is characterized in that plural flow-separating members are disposed in a flowing fluid, each having an opening portion of about 1 to 5 cm in diameter, and fine solid material floated in the fluid is allowed to flow through the openings and collectively aggregate in a predetermined area to thereby separate the fine solid material from the fluid.

According to the solid material flow-separating method of this invention, the fine solid polluted material floating in the polluted water may be separated while it flows, and further fluidized to conduct a purifying treatment on polluted water.

The following members may be used as the flow-separating member as described above: (1) a massive member having opening portions on the surface thereof, each opening portion having plural flow passageways which are penetrated through the massive member and intercommunicated with another opening portion, and fine solid material floating in fluid being trapped at the one opening portion, and corrected and held up in the flow passageways, (2) a cylindrical (barrel-shaped) member which has opening portions on the peripheral surface thereof and disposed in the fluid so that its axis is located in a vertical direction, the fine solid material floating In the fluid being trapped by the opening portions, and collected and held up inside of the cylindrical member, and (3) a member comprising a net-shaped member disposed in parallel to the flow direction or the fluid and a stagnant area disposed at one opposite side to the flow path of the fluid in parallel to the net-shaped member, the fine solid material floating in the fluid being trapped and collected through the opening portions of the net-shaped member, and held up in the stagnant area.

According to this invention, the flow-separating member as described above may be disposed in a housing which has both of a flow-in portion and a flow-out portion and has any lid or no lid, and through which the fluid flows, thereby forming a flow-separating apparatus, and the fluid is allowed to flow through the flow-separating apparatus to perform a solid-material flow-separating treatment.

In this invention, the term "collected and held up" means that the fine solid material floating in fluid is trapped at the opening portions of the flow-separating member, and collected and held up in a predetermined area.

Further, in this invention, the term "flow-separation" means the phenomenon of an action that solid material is separated from fluid through an interaction between the flow of the fluid and the solid material floating in the fluid.

The flow-separating member of this invention which is disposed in the fluid acts as a resistor in the fluid, and it serves to reduce flow velocity of the fluid in the vicinity of the flow-separating member, thereby forming a laminar-flow area. Therefore, there occurs difference in flow velocity in the fluid. Solid material floating in the fluid having low flow-velocity difference is shifted toward an area having low flow velocity with being rotated, finally reaches the laminar-flow area surrounding the flow-separating member, and collected at the area. It has been well known that a low flow-velocity or zero flow-velocity area and a turbulent-flow area exist as a flow state of the fluid. The fine solid material floating in the turbulent-flow area tends to be sprung out toward the laminar-flow area by random flow, so that the fine solid material is integrated (collected) in the laminar-flow area which is formed surrounding the flow-separating member.

As described above, the fine solid material reaching the flow-separating member is trapped and collected at the opening portions each having large aperture or about 1 to 5 cm. The shape of each opening portion of this invention is not limited to a specific one for example, curved shape such as circle, ellipsoid, sector or the like, polygonal shape such as triangle, rectangle or the like, or irregular shape which is not specified because of its complicated and irregular shape, or the like may be used. When the opening portion has the irregular shape, the inscribed circle diameter may be set to about 1 to 5 cm.

If the diameter of kite opening portion of the flow-separating member exceeds 5 cm, some flow occurs in the opening portion, and this flow disenables the floating fine solid material to be trapped and collected inside of the opening portion. After being trapped by the opening portion, the fine solid material is held up in the flow passageway under the opening portion, and then decomposed in anaerobic state to be fluidized. Thereafter, the fluidized material is passed through another intercommunicated opening portion by gravity and discharged to the outside of the flow-separating member. At this time, if the opening portion is designed in smaller diameter than 1 cm, the decomposed fluidized material is not discharged to the outside of the flow-separating member, and thus such small diameter is unfavorable.

The fluid entering the inside of the opening portion of the flow-separating member is kept in the hold-up state where the flow velocity is substantially equal to zero, and the trapped fine solid material is collected and held up in the flow, passageway of the massive member, at the bottom portion of the inside of the cylindrical member or in the stagnant area provided at the one side of the net in accordance with an used mode of the flow-separating member, thereby separating the fine solid material floating in the fluid.

The fine solid material which is trapped and collected in the flow passageway of the massive member is decomposed to fluidized material in an anaerobic state, then moved along the flow passageway penetrating through the massive member by its weight, and then discharged through another opening portion to the outside. In this case, if considering, from the viewpoint of the micro, the flow state when the fluidized material obtained by discomposing the trapped floating solid material in the anaerobic state is discharged, the flow passageway would be temporarily changed from the hold-up state to the flow state, and this it is guessed that the fine solid material reaching from the fluid to the opening portion can be taken in to the flow passageway again to collect and hold up the fine solid material. That is, the flow-separation, trapping, collection, fluidization, etc. are repeated of the fine solid material to enable purification of polluted water, etc.

In the cylindrical flow-separating member, by forming a slender groove at the bottom portion on which the cylindrical member is disposed, the fine solid material which is collected and held up at the bottom portion may be discharged as fluidized material through the, groove like the massive flow-separating member as described above, or the collected fine solid material may be successively extracted out.

Further, in the net-shaped flow-separating member, the fine solid material which is collected and held up in the closed area can be treated in the same manner as the hollow cylindrical flow-separating member.

According to this invention, the massive member having prescribed opening portions, the barrel-shaped member or the net-shaped member is used as the flow-separating member, and the fine solid material is separated from the fluid. In this construction, microorganism such as bacteria is liable to adhere to the surface of the flow-separating member disposed in the fluid, so that the roughness of the surface of the flow-separating member is increased. Accordingly, a boundary layer occurring on the surface of the flow-separating member, that is, a layer area where the flow velocity is low or zero is enlarged, and the flow separation of the fine solid material can be promoted by the velocity difference and/or the flow state as described above.

In the conventional solid/liquid separation method, active sludge and coagulant are used for a sewerage and waterworks respectively to grow hardly-precipitated fine solid to a predetermined size and make it precipitable solid material, and then the solid material thus obtained is precipitated or filtered. On the other hand, according to this invention, as described above, the flow-separating member is disposed in the fluid, and the solid/separation is carried out utilizing the flow-velocity difference for the fine solid material. Accordingly, this invention can be substituted for the conventional solid/liquid separating method containing the growth and precipitation or filtering of the fine solid material.

According to the solid material flow-separating method and apparatus thus constructed, the solid material can be easily separated from the fluid and collected by utilizing rotational movement of the fine solid material due to the flow-velocity difference occurring at a surrounding area of the fine solid material and the viscosity of the fluid. In addition, according to this invention, not only the fine solid material floating in the fluid is separated and removed, but also BOD, etc. can be reduced in a polluted water treatment.

DETAILED DESCRIPTION OF THE PREFERRED EMBODIMENTS

Preferred embodiment according to this invention will be described with reference to the accompanying drawings, however, this invention is not limited to the following embodiments.

Figure 1:
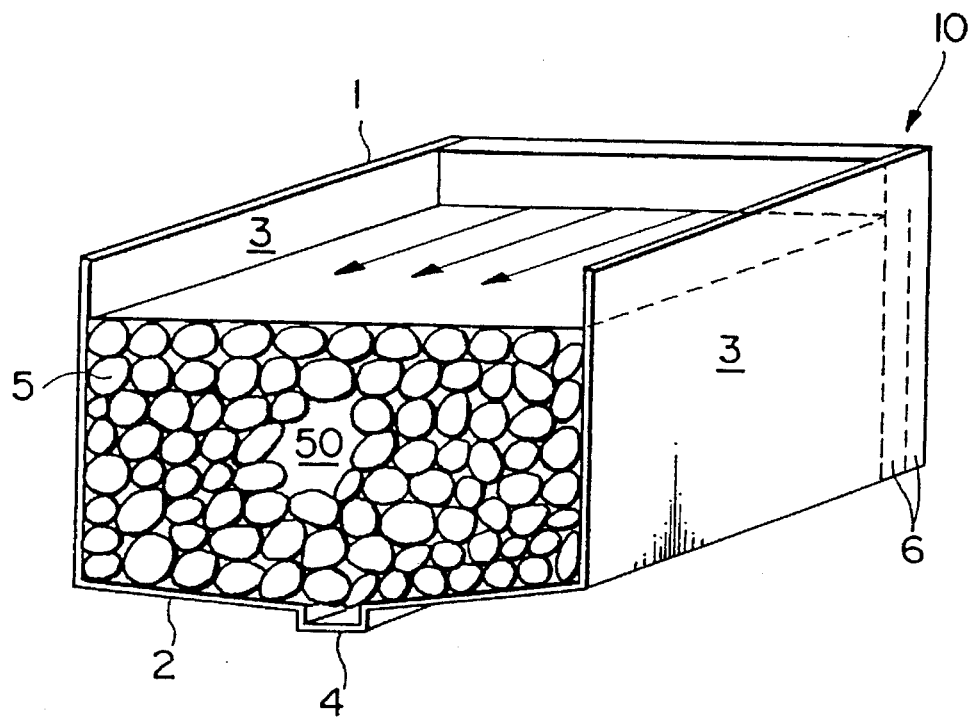
FIG. 1 is a schematic view, partially containing a cross-sectional view, showing the apparatus showing an embodiment of an apparatus equipped with a flow-separating member of this invention.
Figure 2:
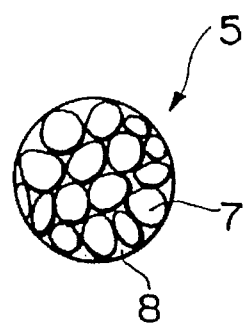
FIG. 2 is a schematic view or an embodiment of a massive flow-separating member of this invention.

FIG. 1 is a schematic diagram showing an embodiment of an apparatus equipped with a flow-separating member of this invention, partially containing a cross-sectional view of the apparatus, and FIG. 2 is a schematic view of a massive flow-separating member disposed in the apparatus as shown in FIG. 1.

In FIG. 1, a fluid (liquid) flowing apparatus 10 comprises a treatment tank 1 of rectangular parallelepiped shape, and the treatment tank 1 has no lid, but both walls 3 in a longitudinal direction thereof. The bottom portion 2 of the treatment tank 1 is so designed to be downwardly slanted from the both wails 3 to the center portion or the tank 1, and a slender groove 4 is formed at the center portion of the bottom portion 2 of the treatment tank 1 to extend in the longitudinal direction of the tank (in the flowing direction of the liquid). A flow-separating member 5 as shown in FIG. 2 is disposed substantially over the whole inside area of the tank 1 to form a flow-separating member Layer 50. The treatment tank 1 is further provided with a flow-in portion 6 for the fluid at one end in the longitudinal direction of the tank 1, and with a flow-out portion (not shown) at the other end, thereby allowing the liquid to flow from the flow-in portion 6 to the flow-out portion.

The flow-separating member 5 as shown in FIG. 2 is formed as follows. That is, aggregate particles 7 each having equivalent diameter of several centimeters are fixed to one another with adhesive agent such as cement, epoxy adhesive agent or the like in substantially spherical shape to form a spherical massive member of about 7 to 15 cm in equivalent diameter. A gap interval between the fixed aggregate lumps 7 is varied in accordance with the size of the aggregate particles 7, and thus a desired gap interval can be obtained by suitably selecting the size of the aggregate particles 7. Usually, if the aggregate particles are designed in centimeter order size, the gap interval could be set to about 1 to 3 cm. Those gaps which are formed as described above and located on the surface of the massive member 5 serve as opening portions 8, and those gaps which are formed as described above and located in the massive member 5 serve as flow passageways which are penetrated through the massive member 5 and continuously intercommunicated with any opening portion 8.

In the fluid (liquid) flow apparatus 1 thus constructed, fluid such as polluted water or the like which contains floating fine solid material therein is made to flow from the flow-in portion 6 in the longitudinal direction of the treatment tank 1 as indicated by an arrow in FIG. 1, thereby reducing the flow-velocity of the flowing water in the vicinity of each flow-separating member 5. Therefore, the fine solid material floating in the flowing water is moved toward the nearest flow-separating member while being rotated due to the difference of the flow velocity at the right and left sides, arrives at the flows-separating member, and then is separated from the flowing water. The separated fine solid material is trapped on the surface of the flow-separating member, taken in the recessed opening portions, and then collected and held up in the flow passageways at the gaps between the aggregate particles.

Further, organic solid material which is mixed in the fine solid material held up in the flow passageway inside of each flow-separating member is decomposed in the anaerobic state to be fluidized, and then discharged from each flow-separating member by gravity. The fluidized material thus discharged falls down to the bottom portion 2 of the tank, and is collected in the slender groove 4 provided at the bottom portion to be discharged to the outside of the tank.

Figure 3:
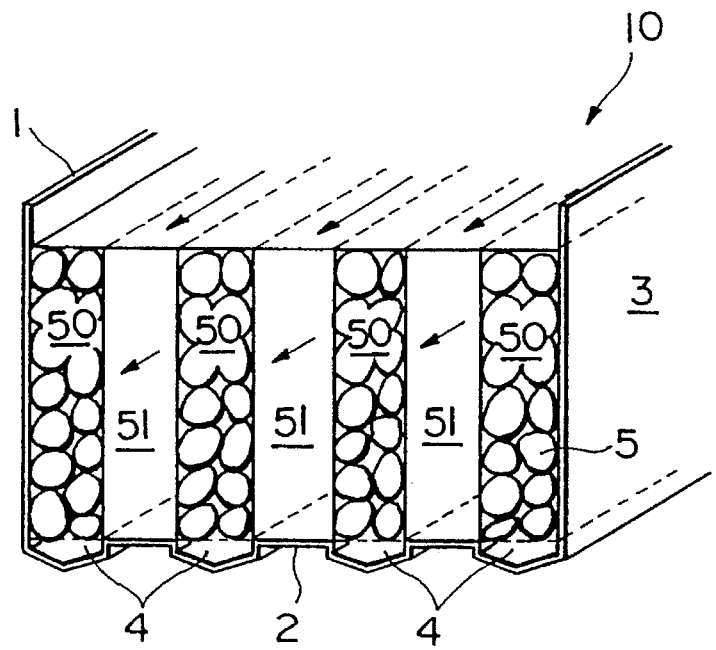
FIG. 3 is a schematic view, partially containing a cross-sectional view, showing another embodiment of the apparatus equipped with the flow-separating member of this invention.

FIG. 3 is a schematic view, partially containing a cross-sectional view, showing another embodiment of the apparatus equipped with the spherical massive flow-separating member as described above.

The construction of the this embodiment is similar to that of the embodiment as shown in FIG. 1, except that the flow-separating members 5 are arranged in stripe form in parallel to the flowing direction to form striped flow-separating member layers 50 in the tank as shown in FIG. 3. In this case, each flow-separating member acts in the same manner as described above to separate the floating fine solid material from the flowing polluted water and collected and store the separated fine solid material. In addition, since the flow velocity of the flowing polluted water is reduced in the neighborhood to the flow-separating member layers 50 in flow spaces 51 between the flow-separating member layers 50, the floating fine solid material in the polluted water flowing through the flow spaces 51 is rotationally moved toward the flow-separating member layer 50 as described above. The fine solid material reaches the surface or the flow-separating member, and separated, collected and held up in the flow passageways. Further, the organic solid material is also decomposed and fluidized, and collected in the slender grooves 4 in the same manner as described above. In this case, the slender groove 4 is formed at the bottom portion 2 of the tank 1 so as to positionally correspond to each flow-separating member layer 50.

The flow-separating member which is formed of aggregate particles each having small diameter is apparently regarded as being identical to a biomembrane carrier as proposed in Japanese Laid-open Patent Application No. 63-310696. However, the biomembrane carrier as proposed in the above publications a hollow member having inner space therein, and ultra-fine holes of 0.05 to 1 mm diameter are formed in the surface of the hollow member so as to be intercommunicated within the inner space. Therefore, each ultra-fine hole is not regarded as being (continuously) penetrated through the biomembrane carrier, and thus the biomembrane carrier is completely different from the flow-separating member of this invention. In addition, the above publication describes that sludge is held in the inner space of the carrier. However, it is impossible for the sludge to be discharge through the ultra-fine holes to the outside by its weight, and in this point the above membrane carrier is different from the flow-separating member of this invention. Further, the above publication discloses a carrier having fine holes as a prior art, however, the construction of the fine holes is unclear.

Figure 4:
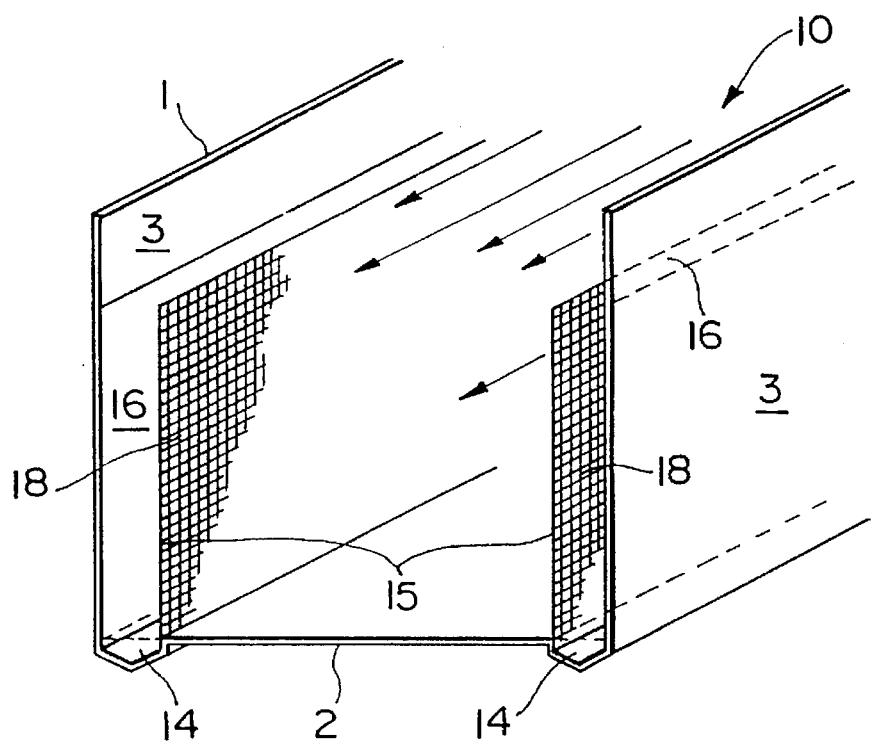
FIG. 4 is a schematic view, partially containing a cross-sectional view, showing another embodiment of the apparatus equipped with another flow-separating member of this invention.

FIG. 4 is a schematic view, partially containing a cross-sectional view, showing another embodiment of the apparatus equipped with another flow-separating member of this invention.

The construction of this embodiment is similar to that of the embodiment as shown in FIG. 1, except that a pair or net-shaped flow-separating members 15, each comprising a net having aperture of about 1 to 3 cm, are disposed in parallel to each other at both side walls 3 of the tank 1 in the longitudinal direction of the fluid flow apparatus 10 respectively as shown in FIG. 4. The same elements as those of FIG. 1 are represented by the same reference numerals.

The arrangement of the net-shaped flow-separating member in the apparatus is made so that the net-shaped flow-separating member is disposed near to each side wall 3 of the tank 1 so as to form a space between the side wall 3 and the net-shaped flow-separating member 15. With this arrangement, a storage area 16 where the fine solid material is collected and held up call be formed at one side of each net (between the net 15 and the side wall 3) using the peripheral walls of the apparatus. For example when the treatment tank of the fluid flow apparatus is designed to have about 60 cm width, each storage area 16 is designed to have about 15 cm width, and usually it is preferably designed to have the width equal to or less than about a quarter of the full width of the treatment tank. Further, the material of the net-shaped flow-separating member is not particularly limited, and it may be formed of metal, synthetic resin or the like.

The flow velocity of the fluid is reduced in the neighborhood of the net-shaped flow-separating member 15 by action of the net-shaped flow-separating member 15. Accordingly, in the same manner as described above, due to the flow-velocity difference occurring at both sides of the solid material, the fine solid material floating in the fluid is rotationally moved to an area where the flow velocity is lower, finally reaching the net-shaped flow-separating member 15. Thereafter, the solid material is taken in the storage areas 16 (the stagnant areas) through the net apertures 18 serving as the opening portions, and collected and held up. The collected and held up solid material is precipitated, and discharged to the outside through slender grooves 14 for collection and removal.

The following modification may be made of the above construction. That is, recessed member is formed in a stripe form so as to meet the flowing direction of the treatment tank 1, and a net is put up at the open side of the recess portion to form a net-shaped flow-separating member using a recessed space as a storage area. A plurality of net-shaped flow-separating members thus constructed are disposed in parallel to the flowing direction in the treatment tank 1 as shown in FIG. 3. In this case, the array of these net-shaped flow-separating members may be used in combination of the storage areas formed at the both side walls.

Figure 5:
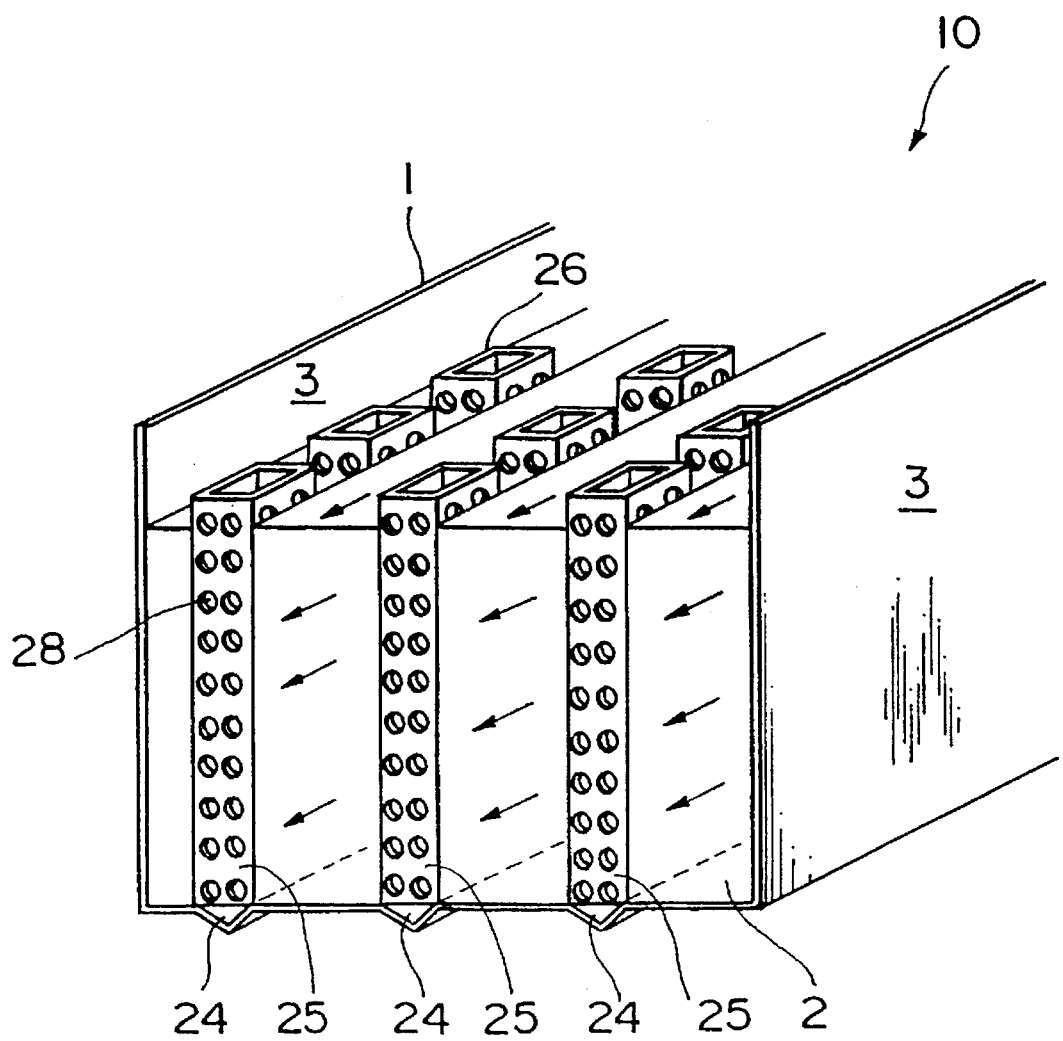
FIG. 5 is a schematic view, partially containing a cross-sectional view, showing another embodiment of the apparatus equipped with the flow-separating member of this invention.
Figure 6:
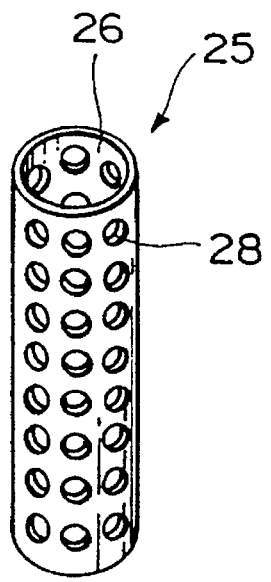
FIG. 6 is a schematic view showing an embodiment of a hollow flow-separating member (barrel or cylindrical shape)
Figure 7:
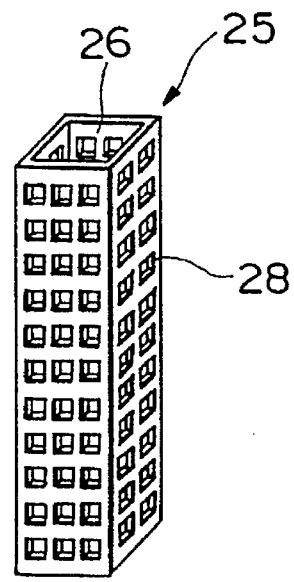
FIG. 7 is a schematic view showing another embodiment of the hollow flow-separating member (square pole shape).

FIG. 5 is a schematic view, partially containing a cross-sectional view, showing another embodiment of the apparatus equipped with another flow-separating member of this invention, and FIGS. 6 and 7 are, schematic views of the pipe-shaped (hollow cylindrical shape and follow rectangular parallelopiped shape, respectively) flow-separating members disposed in the apparatus as shown in FIG. 5, respectively.

As shown in FIG. 5, a plurality of hollow cylindrical or hollow rectangular paralelopiped flow-separating members 25 having small holes serving as opening portions 28 as shown in FIG. 6 or 7 are arranged in rows (in array form) substantially in parallel to both side walls of the tank 1. A slender groove 24 is formed at the bottom portion of each array of the pipe-shaped flow-separating members 25. The fine solid material floating in the fluid is separated from the fluid, falls down toward the bottom side to be collected and held up inside of the pipe-shaped flow-separating members 26, and then discharged through the slender grooves 24 to the outside. The other construction than as described above is similar to the construction as shown in FIGS. 1, 3 and 4. In the following description, the same elements as those of FIG. 1 are represented by the same reference numerals. The actions such as collection, storage, etc. of the floating fine solid material when the fluid such as polluted water or the like is made to flow in the treatment tank 1 are identical to those of the embodiments as described above.

The flow-separating members 25 as shown in FIGS. 6 and 7 are designed in cylindrical and rectangular parallelopiped shapes respectively, and are formed on the peripheral walls thereof with various shapes of small holes having equivalent diameter of about 1 to 5 cm, such as circular holes and rectangular holes respectively. The shape, arrangement and number of the small holes are not limited to specified ones, and they may be selected in accordance with an applicable condition. The sectional shape of the pipe-shaped flow-separating member is not limited to a specific one, and usually circular and rectangular shapes are used. Further, the material of the flow-separating member is not limited to specific one, and synthetic resin or metal is usually used.

EXAMPLES (Embodiment 1)

Conglomerate particles of about 2 to 3 cm were fixed to one another to form a spherical flow-separating member 5 having equivalent diameter of about 10 cm (which is similar to that of FIG. 2). These spherical flow-separating members 5 thus formed are filled in a rectangular parallelopiped treatment tank of 0.5 m in width, 4.0 m in length and 0.5 m in height, thereby forming a liquid flow apparatus 10 similar of that of FIG. 1. In this case, the percentage of voids of the flow-separating member layer was 45%.

Polluted water of 20.9 mg/l in SS, as water to be treated, was made to flow into the liquid flow apparatus 10 thus formed for a hold-up time of 0.5 hour at flow amount of 0.3 l/second. As a result, the flowing water after five hours elapsed had average value of 5.7 mg/l in SS, and thus a removing rate of SS as 72.7%. The polluted water had 15 mg/l in BOD, and it was reduced to 4.5 mg/l after the flow-separating treatment.

(Embodiment 2)

As shown in FIG. 4, metal meshes having aperture of 1 cm were disposed in a rectangular parallelopiped treatment tank of 0.6 m in width, 50.0 m in length and 0.5 m in height so as to be located away from the both side walls of the tank in the longitudinal direction by 15 cm and so as to be in parallel to the both sides and in the same height as the flowing liquid, thereby forming a Liquid flow apparatus 10 having the flow-separating member as shown in FIG. 4.

The same polluted water as the embodiment 1, that is, polluted water of 20.9 mg/l in SS, as water to be treated, was made to flow into the liquid flow apparatus 10 thus formed at flow velocity of 30 cm/S and flow amount of 90 l/second. As a results the flowing water after 48 hours elapsed had average value of 15 mg/l in SS, and thus the removing vale of SS was 30%.

(Embodiment 3)

Small circular holes of 10 mm in diameter were formed at about 5 mm interval in a hollow cylindrical member of 10 cm in outer diameter to form a cylindrical flow-separating member.

Flow-separating thirty seven members 25 thus formed were disposed at about 10 cm interval in a rectangular parallelopiped treatment tank of 0.5 m in width, 4.0 m in length and 0.5 m in height to form a liquid flow apparatus 10 similar to that of FIG. 5.

Polluted water of 8.0 mg/l in SS, as water to be treated, was made to flow into the liquid flow apparatus 10 thus formed for a hold-up time of 0.3 hour at flow amount of 0.8 l/second. As a result, the flowing water after 48 hours elapsed had average value of 4 mg/l in SS, and thus the removing rate of SS was 50%, As is apparent from the embodiments as described above, according to the solid material flow-separating method and apparatus of this invention, the fine solid material floating in the fluid is rotationally moved by the viscosity of the fluid and the flow-velocity difference occurring at the surface; area of the solid material, whereby the solid material can be easily separated from the fluid and collected. Further, not only the separation and removal of the fine solid material can be performed, but also reduction of BOD or the like can be performed treatment for polluted water.

What is claimed is:

1. A solid material flow-separating method for separating fine solid material from fluid, comprising the step of:

disposing plural flow-separating members each having opening portions of about 1 to 5 cm in equivalent diameter in flowing fluid;

moving the fine solid material, while fine solid material is being rotated, toward a laminar-flow area surrounding the flow-separating members;

directing the fine solid material to a surface of the flow-separating members;

trapping, collecting and holding up the fine solid materials within the flow-separating members through the opening portions where the flow velocity is substantially equal to zero; and decomposing the trapped and collected fine solid material to form a fluidized material in an anaerobic state and thereafter discharging the fluidized material through other opening portions in the flow-separating member, thereby separating the fine solid material from the fluid.

2. The solid material flow-separating method as claimed in claim 1, wherein the fluid is polluted water, and further comprising the steps of collecting and holding up fine solid pollutant floating in the polluted water, and then fluidizing the collected and held-up fine solid pollutant, thereby performing purification treatment for the polluted water.

3. The solid material flow-separating method as claimed in claim 1 or 2, wherein said flow-separating members comprise a member having opening portions on the surface thereof and one opening portion has plural flow passageways which are continuously penetrated to other opening portions, the fine solid material in the fluid being trapped and collected through said one opening portion, and held up in said flow passageways.

4. The solid material flow-separating method as claimed in claim 3, wherein said flow-separating members are disposed in a flow-separating apparatus including a housing which has a flow-in portion and a flow-out portion and is equipped with no lid or any lid through which the fluid flows, the fluid being made to flow through said flow-separating apparatus to perform a solid material flow-separating treatment.

5. The solid material flow-separating method as as claimed in claim 1 or 2, wherein said flow-separating members are disposed in a flow-separating apparatus including a housing which has a flow-in portion and a flow-out portion, and is equipped with no lid or any lid through which the fluid flows, the fluid being made to flow through said flow-separating apparatus to perform a solid material flow-separating treatment.

6. The solid material flow-separating method as claimed in claim 1, wherein the flow-separating members comprise a plurality of particles fixed to one another in substantially spherical shape to form a spherical member of about 7 to 15 cm in equivalent diameter.

7. A solid material flow-separating method for separating fine solid material from fluid, comprising the steps of:

disposing plural flow-separating members in flowing fluid, the flow-separating members comprising a pipe member having opening portions on a peripheral surface thereof of about 1 to 5 cm in equivalent diameter, the pipe member being disposed in the flowing fluid with its axis in a direction vertical to the fluid direction, an area within the pipe member having a flow of velocity substantially equal to zero;

moving the fine solid material, while the fine solid material is being rotated, toward a laminar-flow area surrounding the flow-separating members;

directing the fine solid material to a surface of the flow-separating members; and trapping, collecting and holding up the fine solid material within the flow-separating members through the opening portions where the flow velocity is substantially equal to zero, thereby separating the fine solid material from the fluid and discharging the collected fine particles through grooves provided below the flow-separating members.

8. The solid material flow-separating method as claimed in claim 7, wherein said flow-separating members are disposed in a flow-separating apparatus including a housing which has a flow-in portion and a flow-out portion, and is equipped with no lid or any lid through which the fluid flows, the fluid being made to flow through said flow-separating apparatus to perform a solid material flow-separating treating.

9. A solid material flow-separating method for separating fine solid material from fluid, comprising the steps of:

disposing at least one net member in fluid flowing between opposed walls, the at least one net member being disposed from either wall at a distance equal to or less than about a quarter of a width between the opposed walls, such that fluid flow in an area within said distance is less than fluid flow outside said area, said at least one net member having apertures of 1 to 3 cm;

directing the fine solid material in the fluid flowing outside said area to a surface of the net member;

trapping, collecting and holding up the fine solid material within said area through said apertures, thereby separating the fine solid material from the fluid flowing outside said area; and discharging the collected fine solid material through grooves provided at the bottom of said area.

10. The solid material flow-separating method as claimed in claim 9, wherein said flow-separating net member is disposed in a flow-separating apparatus including a housing which has a flow-in portion and a flow-out portion, and is equipped with no lid or any lid through which the fluid flows, the fluid being made to flow through said flow-separating apparatus to perform a solid material flow-separating treatment.

* * * * *